United States Patent
Shimizu

(10) Patent No.: US 8,302,492 B2
(45) Date of Patent: Nov. 6, 2012

(54) MAGNETOSTRICTIVE TORQUE SENSOR AND ELECTRIC POWER STEERING APPARATUS

(75) Inventor: Yasuo Shimizu, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 175 days.

(21) Appl. No.: 12/755,074

(22) Filed: Apr. 6, 2010

(65) Prior Publication Data

US 2010/0263962 A1   Oct. 21, 2010

(30) Foreign Application Priority Data

Apr. 17, 2009  (JP) ................. 2009-101036

(51) Int. Cl.
*G01L 3/02* (2006.01)
(52) U.S. Cl. ................................. 73/862.333
(58) Field of Classification Search ........... 73/862.331–862.333
See application file for complete search history.

(56) References Cited

U.S. PATENT DOCUMENTS

| | | | |
|---|---|---|---|
| 4,853,672 A * | 8/1989 | Yasuda et al. ............... 340/465 |
| 5,165,286 A * | 11/1992 | Hamamura et al. ............ 73/779 |
| 5,313,845 A | 5/1994 | Hayashi et al. |
| 5,490,431 A * | 2/1996 | O'Mahony et al. ...... 73/862.331 |
| 5,508,608 A * | 4/1996 | Goossens .................... 324/174 |
| 6,046,583 A * | 4/2000 | Ayres et al. ................. 324/146 |
| 6,341,535 B1 * | 1/2002 | Yasui ...................... 73/862.333 |
| 6,484,592 B2 * | 11/2002 | Sezaki .................... 73/862.335 |
| 6,809,451 B1 * | 10/2004 | Brown ..................... 310/156.08 |
| 7,013,741 B2 | 3/2006 | Nakamura et al. |
| 7,806,005 B2 | 10/2010 | Watanabe et al. |
| 2008/0295613 A1 | 12/2008 | Shimizu |
| 2012/0018241 A1 * | 1/2012 | Shimizu et al. ............... 180/443 |

FOREIGN PATENT DOCUMENTS

| | | |
|---|---|---|
| JP | 3-002638 A | 1/1991 |
| JP | 6-074838 A | 3/1994 |
| JP | 2004-309184 A | 11/2004 |
| JP | 2007-285793 A | 11/2007 |
| JP | 2008-298534 A | 12/2008 |

* cited by examiner

*Primary Examiner* — Max Noori
(74) *Attorney, Agent, or Firm* — Carrier Blackman & Associates, P.C.; William D. Blackman; Joseph P. Carrier

(57) ABSTRACT

A magnetostrictive torque sensor includes a rotatable shaft rotatably supported by bearings, a magnetostrictive film disposed on the surface of the rotatable shaft, and a detecting coil that detects a change in a magnetic property of the magnetostrictive film. A hollow cylindrical ring is press-fitted over and fixed to the rotatable shaft near the magnetostrictive film, for example, near the right end of the magnetostrictive film.

7 Claims, 13 Drawing Sheets

MAGNETOSTRICTIVE TORQUE SENSOR AND ELECTRIC POWER STEERING APPARATUS

CROSS-REFERENCE TO RELATED APPLICATION

This application is based upon and claims the benefit of priority from Japanese Patent Application No. 2009-101036 filed on Apr. 17, 2009, of which the contents are incorporated herein by reference.

BACKGROUND OF THE INVENTION

1. Field of the Invention

The present invention relates to a magnetostrictive torque sensor, which detects torque based on a change in a magnetic property due to magnetostriction, and to an electric power steering apparatus including such a magnetostrictive torque sensor therein.

2. Description of the Related Art

One known type of contactless torque sensor is a magnetostrictive torque sensor, which detects torque based on a change in a magnetic property due to magnetostriction. Such a magnetostrictive torque sensor is used to detect the steering torque of an automotive steering apparatus (see Japanese Laid-Open Patent Publication No. 2004-309184).

A magnetostrictive torque sensor of the type described above comprises two magnetostrictive films (a first magnetostrictive film and a second magnetostrictive film) having different magnetic anisotropic properties and which are mounted on a rotatable shaft, and first and second detecting coils disposed in confronting relation to the first and second magnetostrictive films respectively. When a torque is applied to the rotatable shaft in order to twist the rotatable shaft, magnetic permeabilities of the first and second magnetostrictive films change, thereby changing the inductances of the first and second detecting coils. Therefore, torque can be detected as a result of changes in the impedances or induced voltages of the first and second detecting coils.

As described above, operation of the magnetostrictive torque sensor relies on a phenomenon in which, when ends of the rotatable shaft are twisted in opposite directions in order to apply a torsional torque to the first and second magnetostrictive films, magnetic properties such as the magnetic permeability or loss of the first and second magnetostrictive films change due to a magnetostriction effect (also referred to as an "inverse magnetostriction effect").

Since the rotatable shaft is required to be mechanically twisted and have bending strength, the rotatable shaft is made of a base material composed of an iron alloy, which is required to be subjected to a heat treatment, such as thermal refining, surface treatment, surface quenching, dip quenching, etc. However, such a heat treatment poses problems in that a significant amount of carbon remains in the base material of the rotatable shaft, thus making the rotatable shaft easily magnetizable.

As described above, since the rotatable shaft can be magnetized easily, if a magnetostrictive torque sensor with the rotatable shaft is incorporated in an electric power steering apparatus, then alternating magnetic fluxes due to an alternating magnetic field from an electric motor on an electric vehicle or the like tend to pass through the rotatable shaft, which is used as a steering shaft. As a result, the magnetostrictive torque sensor outputs a sensor signal, which includes noise generated by such alternating magnetic fluxes. Such noise produces a vibratory sound, which adversely affects the sensor housing as well as the acoustic plate and resonant plates of other devices, which tend to generate noise (alternating magnetic flux sounds). Although such noise can be removed by a low-pass filter, the low-noise filter causes signal delay, which lowers the response of the detected signal, and hence the magnetostrictive torque sensor is unable to generate an output signal having a wide dynamic range.

Such an electric power steering apparatus, which incorporates the magnetostrictive torque sensor therein, fails to give the driver a smooth steering feel, because the electric motor of the electric power steering apparatus that assists the driver in turning the steering wheel suffers from a large delay during operation thereof.

SUMMARY OF THE INVENTION

It is an object of the present invention to provide a magnetostrictive torque sensor, which is capable of solving the above problems, as well as to provide an electric power steering apparatus incorporating such a magnetostrictive torque sensor therein, for producing an improved steering feel.

According to a first aspect of the present invention, there is provided a magnetostrictive torque sensor comprising a shaft member, a magnetostrictive member mounted on the shaft member, a coil for detecting a change in a magnetic property of the magnetostrictive member, and a nonmagnetic member comprising an electric conductor disposed around the shaft member.

The nonmagnetic member prevents leaking alternating magnetic fluxes from passing through the shaft member. Therefore, a sensor signal output from the magnetostrictive torque sensor essentially is not affected by such leaking alternating magnetic flux, and hence vibrations and sounds due to noise, which would otherwise be caused by the sensor signal generated by the magnetostrictive torque sensor, are prevented from being produced. The nonmagnetic member may be made of copper, copper alloy, aluminum, aluminum alloy, or the like. Such materials are easily machinable, less expensive, and more easily available than gold or silver. Therefore, the magnetostrictive torque sensor can be manufactured at low cost, and can be supplied stably to the market.

In the magnetostrictive torque sensor according to the first aspect of the present invention, the nonmagnetic member may have a hollow cylindrical shape. The nonmagnetic member can be mounted in any desired position with increased freedom, since the nonmagnetic member can be directly placed on the shaft member or can be positioned near the coil. Since the nonmagnetic member does not require complex adjustment, the magnetostrictive torque sensor can be manufactured with ease. In addition, the magnetostrictive torque sensor can be reduced in size.

In the magnetostrictive torque sensor according to the first aspect of the present invention, the nonmagnetic member may have a thickness for generating an eddy current at least radially outwardly from the shaft member. Since the nonmagnetic member is in the form of a thick hollow cylinder and is capable of generating an eddy current, the nonmagnetic member can produce a magnetic flux in a direction that cancels out the alternating magnetic flux tending to pass through the shaft member. Therefore, the nonmagnetic member can prevent alternating magnetic fluxes from passing through the shaft member.

In the magnetostrictive torque sensor according to the first aspect of the present invention, the nonmagnetic member is separate from the shaft member, rather than being integral with the shaft member. Consequently, one or more nonmagnetic members can freely be mounted onto the shaft member, at a position or positions for effectively preventing alternating magnetic fluxes from passing through the shaft member. Therefore, the magnetostrictive torque sensor can be manufactured with ease.

The magnetostrictive torque sensor according to the first aspect of the present invention may further comprise a housing accommodating therein at least the shaft member, the magnetostrictive member, and the coil. The housing has an opening defined therein near an end of the shaft member, with the nonmagnetic member being disposed in the opening. Alternating magnetic flux usually tends to pass through the shaft member via a portion thereof positioned outside the housing, e.g., on one or other end of the shaft member, so that most of the alternating magnetic flux tends to pass through the opening of the housing. Since the nonmagnetic member is disposed near the opening of the housing, alternating magnetic flux that leaks from outside of the magnetostrictive torque sensor is effectively prevented by the nonmagnetic member from passing through the base material of the shaft.

According to a second aspect of the present invention, there is provided an electric power steering apparatus, which reduces a steering torque generated when a driver of a vehicle operates a steering wheel of a steering system by applying power of a motor directly to the steering system, comprising a steering torque sensor for detecting the steering torque, the steering torque sensor comprising a steering shaft and a nonmagnetic member comprising an electric conductor disposed around the steering shaft.

Even when an engine, an electric generator, or a motor on an electric vehicle generates leaking alternating magnetic fluxes in an environment around the electric power steering apparatus, such leaking alternating magnetic flux is prevented by the nonmagnetic member from passing through the steering shaft. The electric power steering apparatus does not produce noise and vibrations due to leaking alternating magnetic flux, and the electric power steering apparatus allows the driver to experience a quiet and highly responsive steering feel. In addition, the electric power steering apparatus does not adversely affect other sensors disposed near the shaft member, such as a steering angle sensor, etc.

As described above, the magnetostrictive torque sensor according to the present invention is effective in preventing alternating magnetic fluxes from passing through the shaft member, the magnetostrictive member, or the coil, and thus, the magnetostrictive torque sensor is less susceptible to alternating magnetic fields. The magnetostrictive torque sensor is thus capable of detecting a steering torque highly accurately.

The electric power steering apparatus according to the present invention prevents leaking alternating magnetic fluxes from passing through the shaft member, even when alternating magnetic fields are generated by surrounding apparatus or devices in the vicinity thereof. Therefore, the electric power steering apparatus does not produce noise and vibrations due to leaking alternating magnetic flux, and the electric power steering apparatus allows the driver to experience a quiet and highly responsive steering feel. In addition, the electric power steering apparatus does not adversely affect other sensors disposed near the shaft member, such as a steering angle sensor, etc.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
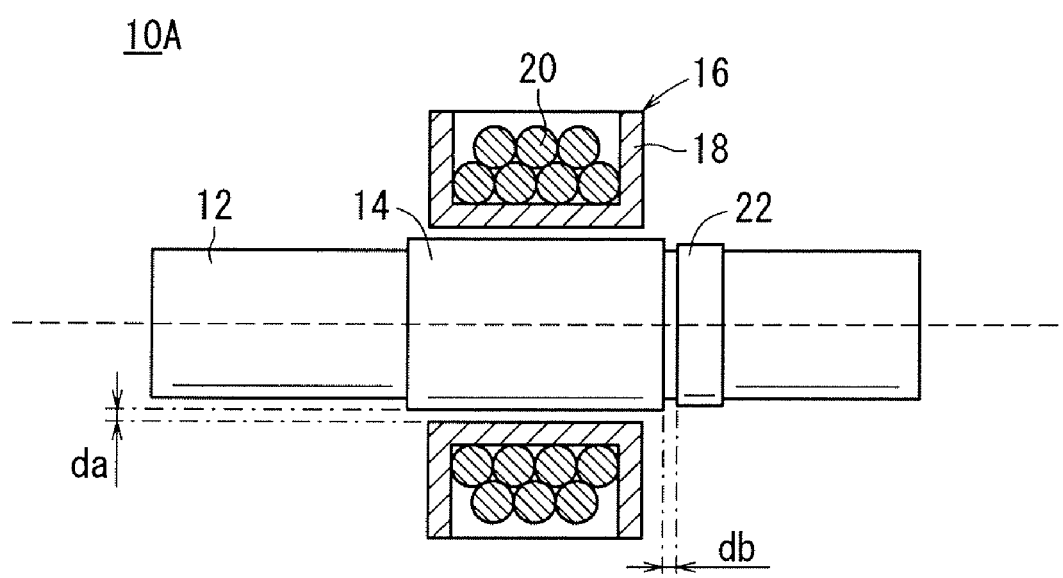
FIG. 1 is a side-elevational view, partially in cross section, of a first torque sensor according to the present invention.

Magnetostrictive torque sensors according to preferred embodiments of the present invention, and electric power steering apparatus incorporating such magnetostrictive torque sensors therein, will be described below with reference to FIGS. 1 through 13.

Like or corresponding parts are denoted by like or corresponding reference characters throughout the views.

First, a magnetostrictive torque sensor according to a first embodiment of the present invention (hereinafter referred to as a "first torque sensor 10A") will be described below with reference to FIGS. 1 through 4B.

As shown in FIG. 1, the first torque sensor 10A comprises a rotatable shaft 12 (shaft member) rotatably supported by bearings (not shown), a magnetostrictive film (magnetostrictive member) mounted on a surface of the rotatable shaft 12, and a detecting coil 16 (coil) for detecting changes in magnetic properties of the magnetostrictive film 14.

Since the rotatable shaft 12 must be mechanically strong, the rotatable shaft 12 is made from a steel material (SC material) for use in mechanical structures, or from a chromium-molybdenum steel material (SCM material). Additional mechanical strength and tenacity is imparted to the rotatable shaft 12 by means of a heat treatment, such as a surface treatment, e.g., induction hardening, carburizing, or the like. Therefore, carbon tends to remain in the base material and on the surface of the rotatable shaft 12, thereby making the rotatable shaft 12 easily magnetizable.

The magnetostrictive film 14 is made of an Fe—Ni alloy, an Fe—CO alloy, an Sm—Fe alloy, or the like. In the first embodiment, the magnetostrictive film 14 is made of an Fe—Ni alloy. The magnetostrictive film 14 has a thickness in the range from about 5 to 100 μm, and is formed on the rotatable shaft 12 by plating, spraying, sputtering, evaporation, bonding, or the like, so that the magnetostrictive film 14 is deposited with a substantially uniform thickness on an outer circumferential surface of the rotatable shaft 12 in intimate contact therewith. Before the magnetostrictive film 14 is formed, the outer circumferential surface of the rotatable shaft 12, on which the magnetostrictive film 14 is to be formed, is cleaned with an alkaline solution, water, an acid solution, or the like, after the rotatable shaft 12 has been machined. Therefore, the magnetostrictive film 14 is held in highly intimate contact with the outer circumferential surface of the rotatable shaft 12.

The magnetostrictive film 14 is anisotropic. The magnetostrictive film 14 is rendered anisotropic as follows: While a torsional torque (hereinafter also referred to simply as "torque"), which is in the range of about 5 to 200 Nm, or which may be in a higher or lower range if necessary, is applied to the magnetostrictive film 14 through the rotatable shaft 12, the magnetostrictive film 14 is heated to a temperature ranging from about 300° C. to 500° C. for a period of time ranging from several seconds to several hundreds of seconds, by means of a heat treatment such as high-frequency induction heating. When the magnetostrictive film 14 is heated, strains caused in the magnetostrictive film 14 by the torque (5 to 200 Nm) applied to the magnetostrictive film 14 through the rotatable shaft 12 are removed, so that the magnetostrictive film 14 is essentially free of stresses. Then, the magnetostrictive film 14 is cooled down to normal temperature. Thereafter, the torque applied to the magnetostrictive film 14 through the rotatable shaft 12 is released, whereupon the magnetostrictive film 14 is made anisotropic. In other words, the torque from the rotatable shaft 12 acts on the magnetostrictive film 14 in a direction opposite to the direction in which the torsional torque was applied.

Figure 2:
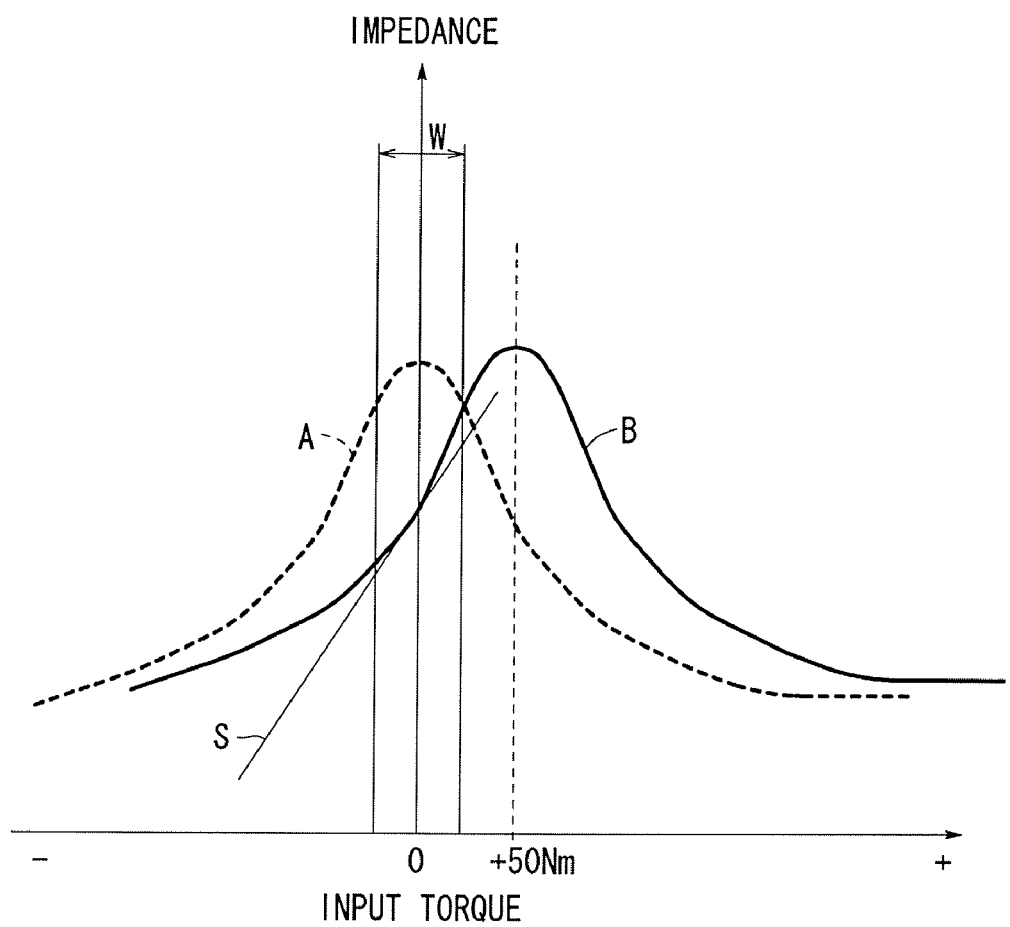
FIG. 2 is a characteristic diagram illustrating how the impedance of a detecting coil changes depending on an input torque applied to the first torque sensor.

The characteristics of the magnetostrictive film 14, thus rendered anisotropic, will be described below with reference to FIG. 2. FIG. 2 is a characteristic diagram having a horizontal axis representing torque applied to the rotatable shaft 12, i.e., to the magnetostrictive film 14 thereof, and a vertical axis representing impedance of the detecting coil 16. In FIG. 2, the broken-line characteristic curve A indicates the output characteristic of the detecting coil 16 combined with the magnetostrictive film 14 before being rendered anisotropic, whereas the solid-line characteristic curve B indicates the output characteristic of the detecting coil 16 combined with the magnetostrictive film 14 having been rendered anisotropic. More specifically, the magnetostrictive film 14, which causes the detecting coil 16 to have an output characteristic as indicated by the solid-line characteristic curve B, is rendered anisotropic as follows: While a torsional torque of 50 Nm is applied to the magnetostrictive film 14 through the rotatable shaft 12, the magnetostrictive film 14 is heated by a heat treatment such as high-frequency induction heating to a temperature ranging from about 300° C. to 500° C. for a period of time ranging from several seconds to several hundreds of seconds. When the magnetostrictive film 14 is heated, strains caused in the magnetostrictive film 14 by the torque applied to the magnetostrictive film 14 through the rotatable shaft 12 are removed. Thereafter, the magnetostrictive film 14 is cooled down to normal temperature. It is believed that strains caused in the magnetostrictive film 14 by the torque are capable of being removed by heating due to the fact that creep is produced in the magnetostrictive film 14 by such heating. A torque close to the applied torque of 50 Nm, e.g., a torque of about 45 Nm, remains in the magnetostrictive film 14. The magnetostrictive film 14, having thus been rendered anisotropic, provides a high gradient s (see FIG. 2), i.e., a high sensitivity, within a substantial torque range W in which the first torque sensor 10A normally is used.

As shown in FIG. 1, the detecting coil 16, which is in the form of a hollow cylindrical shape, is disposed around the magnetostrictive film 14 having a substantially uniform radial gap da formed therebetween. The gap da is in the range of $0 < da \leq 1$ mm. The detecting coil 16 comprises a bobbin 18 made of resin, which has a substantially channel-shaped cross section, and a wire 20 wound in multiple layers in the bobbin 18. The detecting coil 16 is excited at a frequency of 10 kHz, for example, within a frequency range from 1 kHz to 100 kHz, in order to detect the magnetic permeability between the detecting coil 16 and the anisotropic magnetostrictive film 14.

Figure 3:
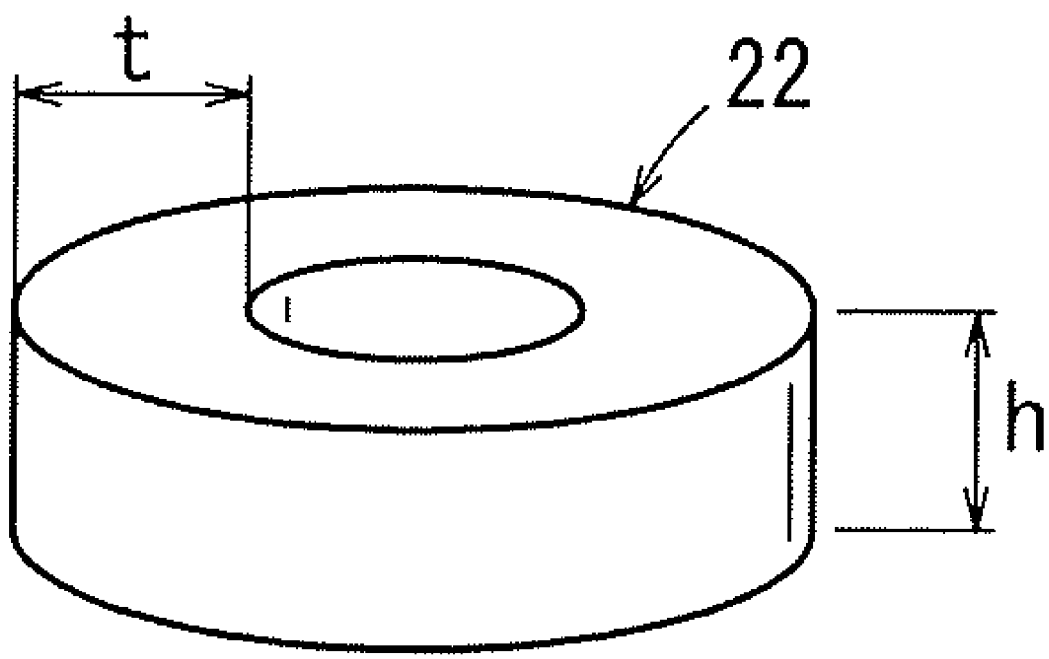
FIG. 3 is a perspective view of a ring fixed to the rotatable shaft of the first torque sensor.

The first torque sensor 10A additionally includes a hollow cylindrical ring (nonmagnetic member) 22 made of a nonmagnetic material, which is press-fitted over and fixed to the rotatable shaft 12 near the magnetostrictive film 14, e.g., near the right end of the magnetostrictive film 14 as shown in FIG. 1. The right end of the magnetostrictive film 14 and the left end of the ring 22 are spaced from each other by a gap db, which preferably lies within a range of $0 < db \leq 10$ mm. However, the gap db may be greater than this preferable range. The ring 22 may be fixed to the rotatable shaft 12 by adhesive bonding or crimping. The ring 22 may be positioned near the left end of the magnetostrictive film 14. Alternatively, two rings 22 may be provided respectively proximate right and left ends of the magnetostrictive film 14. The ring 22 is made of a nonmagnetic material, which is a good electric conductor having a small electric resistance, e.g., gold (Au), silver (Ag), copper (Cu), aluminum (Al), or the like, and has a small volume resistivity. In the present embodiment, the ring 22 is made of aluminum. The ring 22 should preferably have a radial thickness large enough to generate an eddy current radially outwardly from the rotatable shaft 12. For example, as shown in FIG. 3, the ring 22 has an axial length h ranging from 1 to 5 mm, and a radial thickness t ranging from 1 to 5 mm. However, the ring 22 may have greater dimensions in certain cases.

The principles of operation of the first torque sensor 10A will be described below.

Operation of the first torque sensor 10A relies on a phenomenon in which, when a torsional torque is applied to the first magnetostrictive film 14 through the rotatable shaft 12, the magnetic properties thereof, such as magnetic permeability or loss of the magnetostrictive film 14, change due to the magnetostriction effect (inverse magnetostriction effect). Changes in the magnetic properties, such as magnetic permeability or loss of the magnetostrictive film 14, are electrically detected by the detecting coil 16. More specifically, changes in the magnetic properties are detected as changes in the inductance (including reactance) or impedance (including resistance) of the detecting coil 16. If the magnetostrictive film 14 is made of an Fe—Ni alloy, then the magnetostrictive film 14 has a positive magnetostriction constant. When a tensile stress is applied to the magnetostrictive film 14, the magnetic permeability thereof increases. Conversely, when a compressive stress is applied to the magnetostrictive film 14, the magnetic permeability thereof decreases. A compressive stress is normally applied to the magnetostrictive film 14 because of the anisotropic properties thereof. Therefore, when a rightward (clockwise) torque (+) is applied to the magnetostrictive film 14 and is increased within the torque range W, the compressive stress become smaller and the magnetic permeability is increased, and hence the impedance of the detecting coil 16 increases. Conversely, when a leftward (counterclockwise) torque (−) is applied to the magnetostrictive film 14, the compressive stress is further reduced, and the magnetic permeability is reduced, and hence the impedance of the detecting coil 16 decreases. The change in impedance is electrically detected in order to detect the applied torque.

Figure 4A:
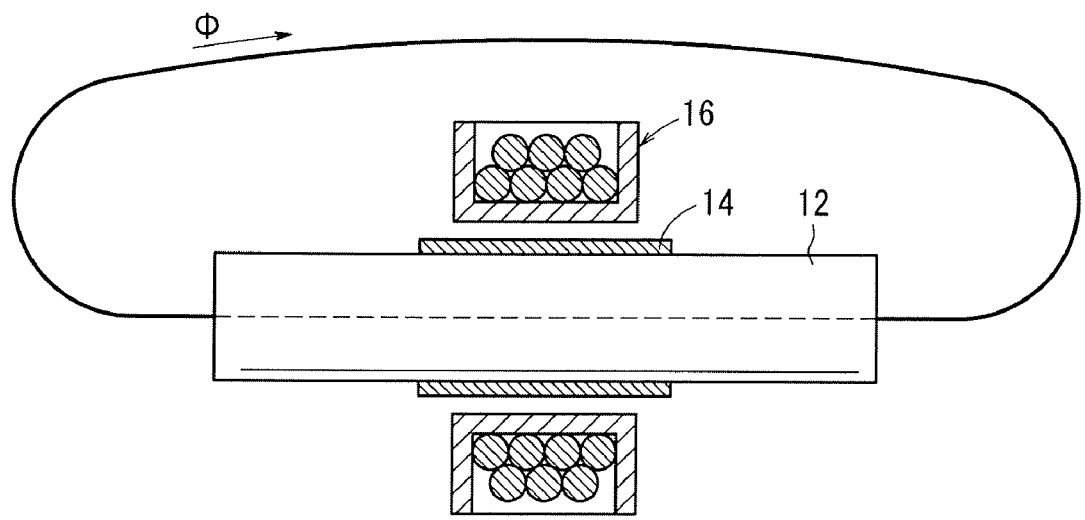
FIG. 4A is a side-elevational view, partially in cross section, showing the manner in which an alternating magnetic flux passes through the rotatable shaft of an ordinary magnetostrictive torque sensor.
Figure 4B:
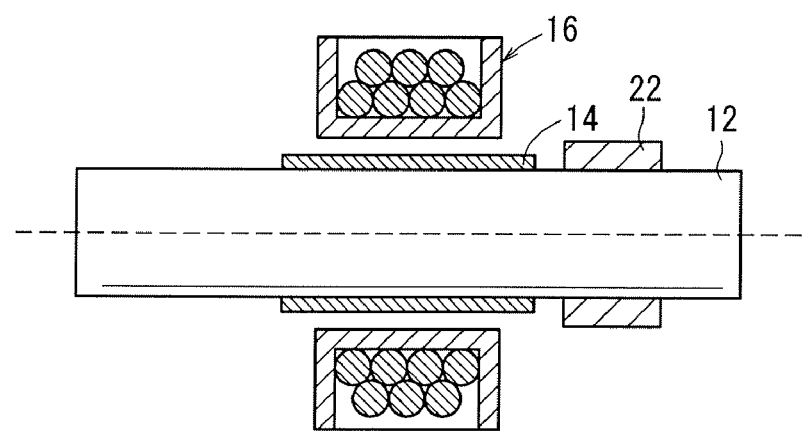
FIG. 4B is a side-elevational view, partially in cross section, showing the manner in which an alternating magnetic flux is blocked against passage through the rotatable shaft of the first torque sensor.

Operation of the ring 22 will be described below. If the first torque sensor 10A is placed near a rotary machine such as an engine, an electric generator, or an industrial motor, then an alternating magnetic flux Φ leaks from the rotary machine and tends to pass through the base material of the rotatable shaft 12, as shown in FIG. 4A. However, as shown in FIG. 4B, the ring 22 on the rotatable shaft 12 is effective at preventing the alternating magnetic flux Φ from passing through the base material of the rotatable shaft 12.

More specifically, when the alternating magnetic flux Φ passes through the ring 22 via the rotatable shaft 12, the ring 22 generates an eddy current, which in turn generates a magnetic flux in a direction to cancel out the alternating magnetic flux Φ that passes through the rotatable shaft 12. Therefore, the ring 22 effectively prevents the alternating magnetic flux Φ from passing through the rotatable shaft 12. Since the electric resistance of the ring 22 is small, a portion of the alternating magnetic flux is consumed as heat. The alternating magnetic flux Φ, which is prevented from passing through the rotatable shaft 12, passes through another path. Since the volume resistivity of the ring 22 is smaller, the eddy current generated by the ring 22 is greater, and the ring 22 is more effective at preventing the alternating magnetic flux Φ from passing through the rotatable shaft 12. If two rings 22 are provided respectively near right and left ends of the magnetostrictive film 14, then such rings 22 are even more effective at preventing the alternating magnetic flux Φ from passing through the rotatable shaft 12.

Since the alternating magnetic flux Φ is prevented from passing through the rotatable shaft 12, the sensor signal generated by the first torque sensor 10A essentially is not affected by the alternating magnetic flux Φ, and hence vibrations and sounds due to noise, which would otherwise be caused by the sensor signal generated by the first torque sensor 10A, are prevented from being produced. Since the first torque sensor 10A does not need to be combined with a low-pass filter, the sensor signal generated by the first torque sensor 10A is not delayed. Therefore, the first torque sensor 10A has a high response, i.e., the first torque sensor 10A can produce an output signal within a wide dynamic range. Inasmuch as the ring 22 is made of aluminum, the ring 22 can easily be manufactured and assembled in position. Since aluminum is inexpensive and readily available compared with gold and silver, the first torque sensor 10A can be manufactured at low cost, and can be supplied stably to the market.

The ring 22 in the form of a hollow cylinder can be mounted in any desired position with increased freedom, since the ring 22 can be directly placed on the rotatable shaft 12, or can be positioned near the detecting coil 16. Since the ring 22 does not require complex adjustments, the first torque sensor 10A can be manufactured with ease. In addition, the first torque sensor 10A can be reduced in size.

The ring 22 is separate from the rotatable shaft 12, rather than being formed integrally with the rotatable shaft 12. Consequently, one or more rings 22 may freely be mounted on the rotatable shaft 12 at a position or positions for effectively preventing the alternating magnetic flux Φ from passing through the rotatable shaft 12. Therefore, the first torque sensor 10A can be manufactured with ease.

A magnetostrictive torque sensor according to a second embodiment of the present invention (hereinafter referred to as a "second torque sensor 10B") will be described below with reference to FIGS. 5A through 6B.

Figure 5A:
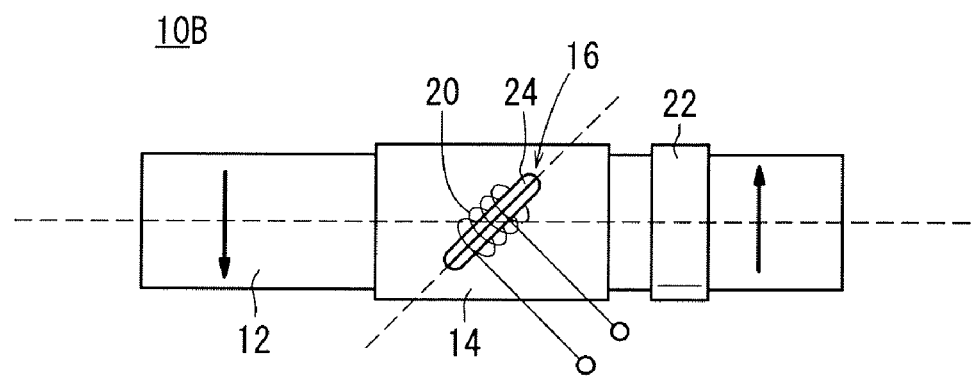
FIGS. 5A and 5B are views showing the structure of a second first torque sensor according to the present invention.
Figure 5B:
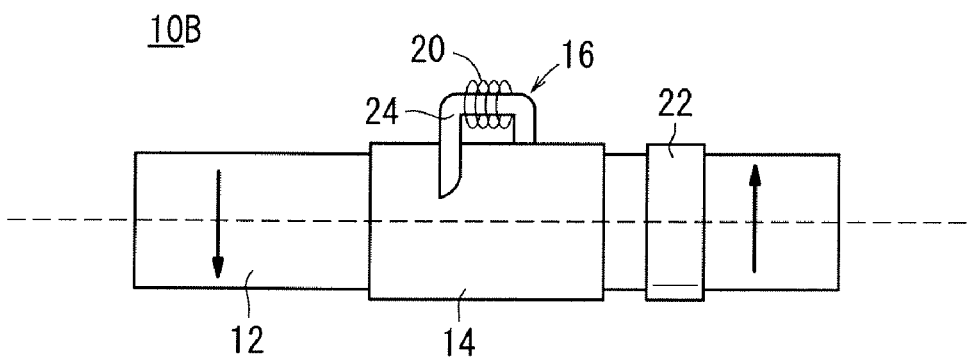

The second torque sensor 10B is similar to the first torque sensor 10A described above, but differs from the first torque sensor 10A in that, as shown in FIGS. 5A and 5B, the detecting coil 16 comprises a yoke 24 having a substantially channel-shaped cross section made of a soft magnetic material such as magnetic sheet steel or the like, and a wire 20 wound in multiple layers around the yoke 24.

Principles of operation of the second torque sensor 10B will be described below.

Similar to the first torque sensor 10A, operation of the second torque sensor 10B also relies on the phenomenon that when torsional torque is applied to the magnetostrictive film 14 through the rotatable shaft 12, magnetic properties such as magnetic permeability or loss of the magnetostrictive film 14 change due to the magnetostriction effect (inverse magnetostriction effect). Changes in magnetic properties, such as magnetic permeability or loss of the magnetostrictive film 14, are electrically detected by the detecting coil 16.

More specifically, changes in the magnetic properties are detected as changes in inductance (including reactance) or impedance (including resistance) of the detecting coil 16. If the magnetostrictive film 14 is made of an Fe—Ni alloy, then the magnetostrictive film 14 has a positive magnetostriction constant. When a tensile stress is applied to the magnetostrictive film 14, the magnetic permeability thereof increases. Conversely, when a compressive stress is applied to the magnetostrictive film 14, the magnetic permeability thereof decreases. As shown in FIGS. 5A and 5B, the detecting coil 16 is inclined at about 45° to the axis of the rotatable shaft 12 in order to enable the applied torsional torque to be detected as a tensile stress or a compressive stress.

Figure 6A:
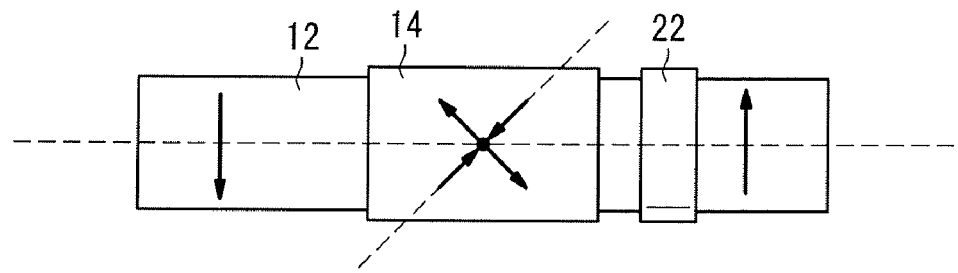
FIGS. 6A and 6B are views showing operation of the second first torque sensor according to the present invention.
Figure 6B:
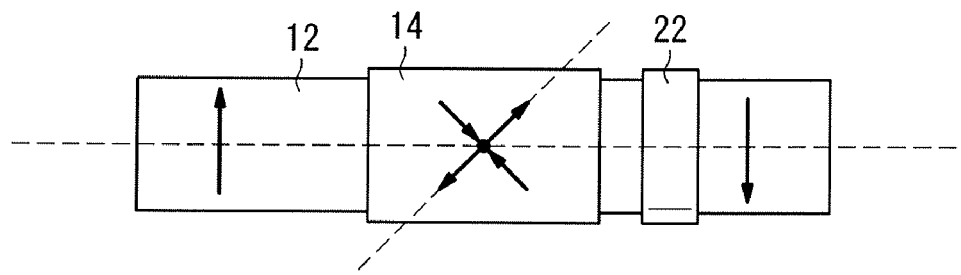

Specific details of the principles of operation of the second torque sensor 10B will be described below with reference to FIGS. 6A and 6B. FIG. 6A shows the second torque sensor 10B, in which a rightward (clockwise) torque has been applied to the magnetostrictive film 14. Since the detecting coil 16 is inclined at about 45° to the axis of the rotatable shaft 12, a compressive stress produced in the magnetostrictive film 14, in a direction of about 45° to the axis of the rotatable shaft 12, is detected, and the magnetic permeability of the magnetostrictive film 14 is reduced. Such a reduction in the magnetic permeability of the magnetostrictive film 14 is electrically detected by the detecting coil 16, i.e., the inductance of the detecting coil 16 is reduced. FIG. 6B shows the second torque sensor 10B, in which a leftward (counterclockwise) torque has been applied to the magnetostrictive film 14. Since the detecting coil 16 is inclined at about 45° to the axis of the rotatable shaft 12, a tensile stress produced in the magnetostrictive film 14 is detected, and the magnetic permeability of the magnetostrictive film 14 is increased. Such an increase in the magnetic permeability of the magnetostrictive film 14 is electrically detected by the detecting coil 16, i.e., the inductance of the detecting coil 16 is increased. The change in inductance of the detecting coil 16 is detected in order to detect the applied torque.

Since the rotatable shaft 12 must be mechanically twisted and also requires a certain amount of bending strength, the rotatable shaft 12 is made of a base material formed from iron alloy, which necessarily is subjected to a heat treatment such as thermal refining, surface treatment, surface quenching, dip quenching, etc. However, the heat treatment poses a problem, in that a significant of carbon tends to remain in the base material of the rotatable shaft 12, thereby making the rotatable shaft easily magnetizable.

Similar to the first torque sensor 10A, the second torque sensor 10B includes a hollow cylindrical ring 22, which is press-fitted over and fixed to the rotatable shaft 12 near the magnetostrictive film 14. The ring 22 is effective in preventing the alternating magnetic flux Φ from passing through the rotatable shaft 12. Consequently, the second torque sensor 10B offers the same advantages as the first torque sensor 10A.

A magnetostrictive torque sensor according to a third embodiment of the present invention (hereinafter referred to as a "third torque sensor 10C") will be described below with reference to FIG. 7.

Figure 7:
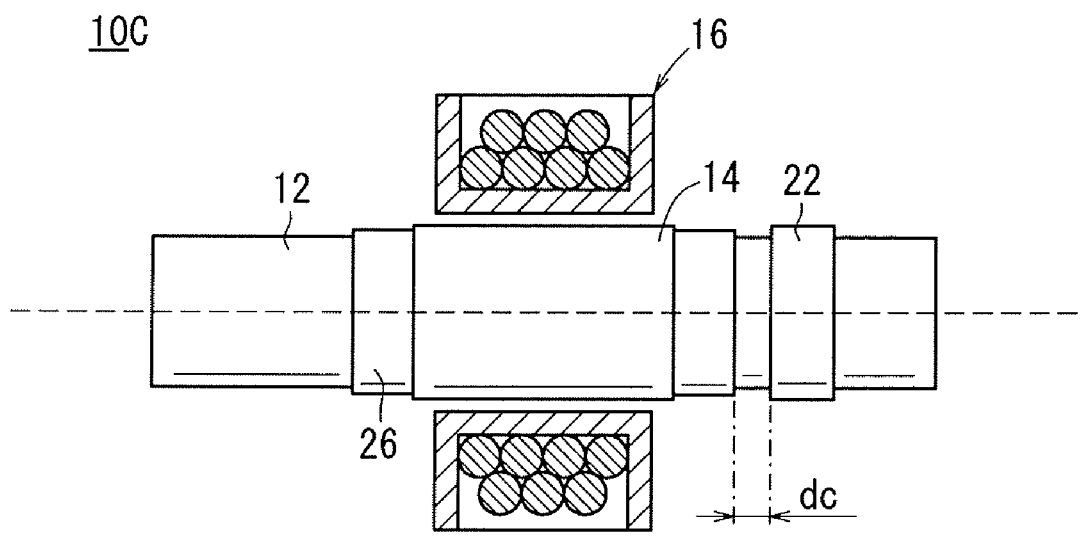
FIG. 7 is a side-elevational view, partially in cross section, of a third torque sensor according to the present invention.

The third torque sensor 10C is similar to the first torque sensor 10A described above, but differs from the first torque sensor 10A in that, as shown in FIG. 7, the third torque sensor 10C includes an intermediate film 26 interposed between the rotatable shaft 12 and the magnetostrictive film 14.

The intermediate film 26, which is interposed between the rotatable shaft 12 and the magnetostrictive film 14, is made of a metal such as tin (Sn), lead (Pb), bismuth (Bi), indium (In), or cadmium (Cd), or an alloy including one of these metals as a chief component. While a torsional torque is applied to the rotatable shaft 12, the assembly is heated to a temperature equal to or higher than the melting point of the material of the intermediate film 26 in order to remove strains caused by the torque applied to the magnetostrictive film 14. Thereafter, while the torque continues to be applied, the assembly is cooled to normal temperature in order to solidify the intermediate film 26. After the intermediate film 26 has become solidified, the applied torque is removed, thereby rendering the magnetostrictive film 14 anisotropic. The third torque sensor 10C thus fabricated has characteristics similar to those shown in FIG. 2.

The rotatable shaft 12 of the third torque sensor 10C also must be mechanically strong. Since the rotatable shaft 12 is made of a base material formed from iron alloy, which necessarily is strengthened by application of a heat treatment thereto, the rotatable shaft 12 is easily magnetizable.

Similar to the first torque sensor 10A, the third torque sensor 10C includes a hollow cylindrical ring 22 press-fitted over and fixed to the rotatable shaft 12 near the magnetostrictive film 14, e.g., near the right end of the intermediate film 26 shown in FIG. 7. The ring 22 is effective in preventing the alternating magnetic flux Φ from passing through the rotatable shaft 12. Consequently, the third torque sensor 10C offers the same advantages as the first torque sensor 10A. The right end of the intermediate film 26 and the left end of the ring 22 are spaced from each other by a given gap dc, which preferably is in the range of $0 \leq dc \leq 10$ mm. However, the gap dc may be greater than the preferable range in certain cases. The ring 22 may be positioned near the left end of the intermediate film 26. Alternatively, two rings 22 may be provided, which are disposed respectively near the right and left ends of the intermediate film 26.

A magnetostrictive torque sensor according to a fourth embodiment of the present invention (hereinafter referred to as a "fourth torque sensor 10D") will be described below with reference to FIG. 8.

Figure 8:
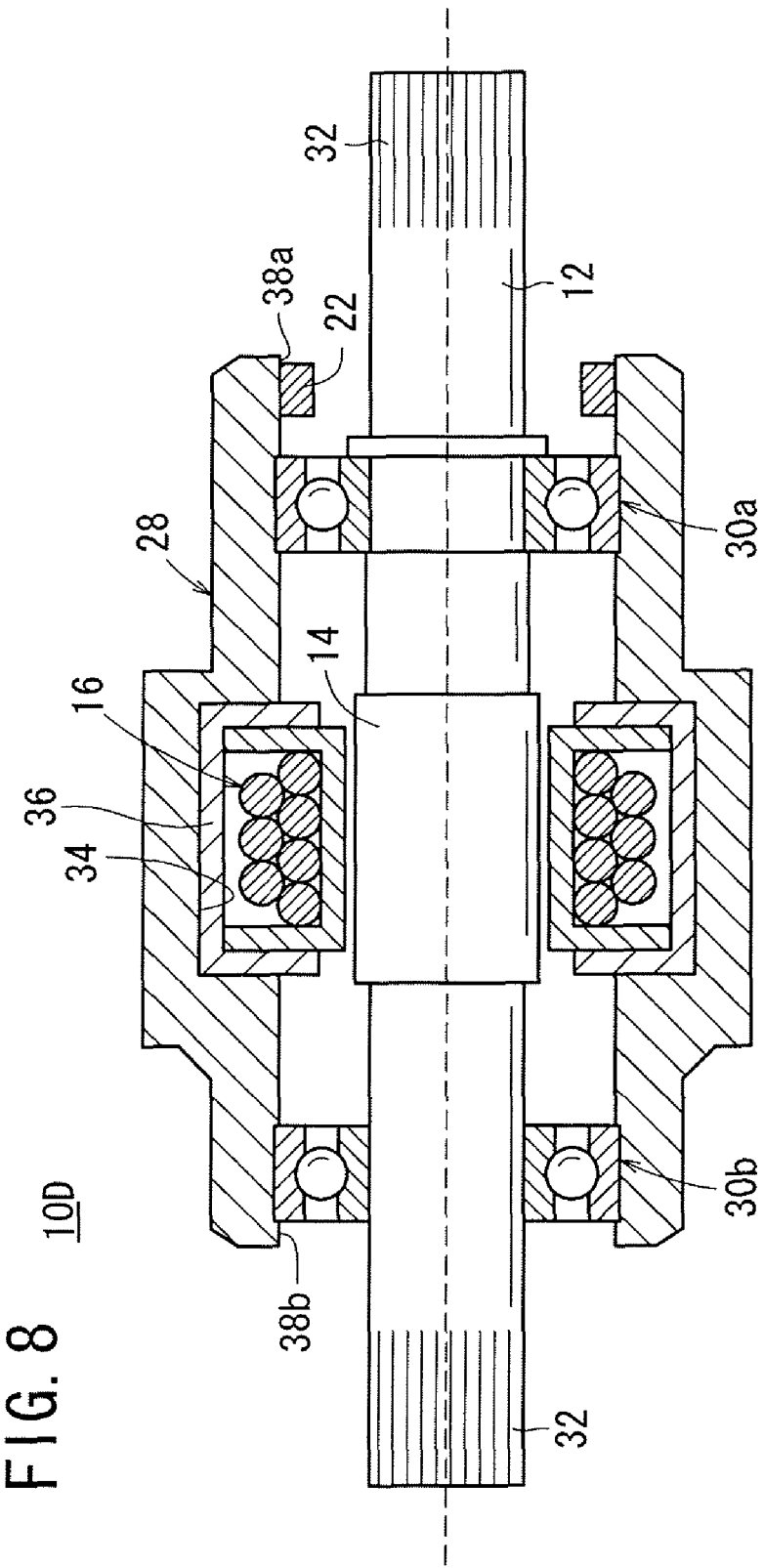
FIG. 8 is a side-elevational view, partially in cross section, of a fourth torque sensor according to the present invention.

The fourth torque sensor 10D is similar to the first torque sensor 10A described above, but differs from the first torque sensor 10A in that, as shown in FIG. 8, the fourth torque sensor 10 includes a housing 28, which accommodates therein at least the rotatable shaft 12, the magnetostrictive film 14, the detecting coil 16, and a hollow cylindrical ring 22 fixed to the housing 28.

The housing 28 is made of resin or metal. If the housing 28 is made of metal, the housing 28 may be made of an iron alloy containing aluminum, or the housing 28 may be made of an aluminum alloy containing copper. Aluminum alloys containing pure copper or a copper alloy exhibit lower electrical resistance than other aluminum alloys. In the present embodiment, the housing 28 is made of an aluminum alloy containing copper.

The rotatable shaft 12 is rotatably supported in the housing 28 by a first bearing 30a disposed on one end of the housing 28, and a second bearing 30b disposed on the other end of the housing 28. The rotatable shaft 12 has serrations 32, which enable the rotatable shaft 12 to be securely connected to other devices. Rather than serrations 32, the rotatable shaft 12 may be connected to other devices by key and key grooves, flanges, or rubber couplings.

The housing 28 has an annular recess 34 defined substantially axially centrally in the inner circumferential surface thereof, which faces the rotatable shaft 12, and housing the detecting coil 16 therein. An annular yoke 36 made of a soft magnetic material, such as magnetic sheet steel or the like, is interposed between the detecting coil 16 and the surface of the housing 28 that defines the annular recess 34.

The ring 22 is made of pure copper, pure aluminum, a copper alloy, or an aluminum alloy, which has a smaller volume resistivity, i.e., a smaller electric resistance, than the aluminum alloy of the housing 28. The ring 22 is fixed to the inner circumferential surface of the housing 28 and near to an opening 38a of the housing 28. The opening 38a of the housing 28, i.e., an end face of the housing 28, and the right end of the ring 22 are spaced from each other by a gap, which preferably is within a range of $0 \leq gap \leq 10$ mm. However, the gap may be greater than the preferable range in certain cases. The ring 22 may be press-fitted in the housing 28, or may be fixed thereto by adhesive bonding or crimping. The ring 22 may also be fixed to the inner circumferential surface of the housing 28 near the other opening 38b of the housing 28. Further, two rings 22 may be fixed to the inner circumferential surface of the housing 28, each near the openings 38a, 38b of the housing 28, respectively. The ring 22 may be fixed to an end face of the first bearing 30a near one end of the rotatable shaft 12, or to an end face of the second bearing 30b near the other end of the rotatable shaft 12. Alternatively, two rings 22 may be affixed to respective end faces of the first and second bearings 30a, 30b.

If the fourth torque sensor 10D is placed near a rotary machine such as an engine, an electric generator, or an industrial motor, then an alternating magnetic flux Φ leaks from the rotary machine and passes through the base material of the rotatable shaft 12, in a manner similar to the fashion shown in FIG. 4A. At this time, the alternating magnetic flux Φ passes through the rotatable shaft 12 via a portion thereof that is positioned outside the housing 28, e.g., at one or other end of the rotatable shaft 12, so that most of the alternating magnetic flux Φ tends to pass through the opening 38a of the housing 28.

Since the ring 22 is disposed near the opening 38a of the housing 28, the alternating magnetic flux Φ, which leaks from the rotary machine, is effectively prevented by the ring 22 from passing through the base material of the rotatable shaft 12. Therefore, the fourth torque sensor 10D offers the same advantages as the first torque sensor 10A.

An electric power steering apparatus, in accordance with embodiments of the present invention to which the principles of the first through fourth torque sensors 10A through 10D are applied, will be described below with reference to FIGS. 9 through 13.

Figure 9:
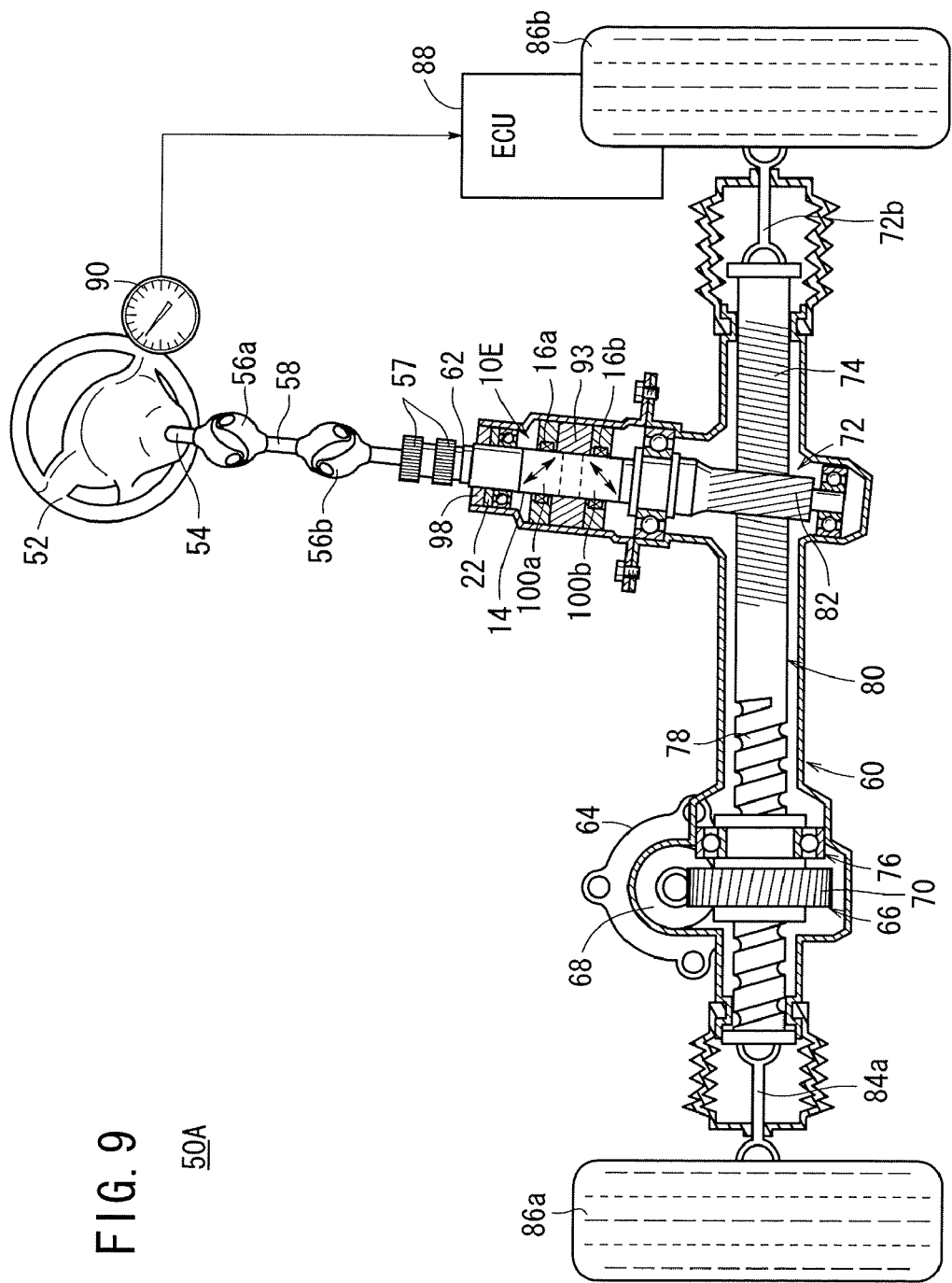
FIG. 9 is a cross-sectional view of a first power steering apparatus according to the present invention.

FIG. 9 shows in cross section an electric power steering apparatus according to a first embodiment of the present invention (hereinafter referred to as a "first power steering apparatus 50A"). As shown in FIG. 9, the first power steering apparatus 50A is arranged such that a steering torque and a steering angle, which are produced when the driver of a vehicle incorporating the first power steering apparatus 50A therein turns a steering wheel 52, are applied through a steering shaft 54, a first universal joint 56a, an intermediate shaft 58, a second universal joint 56b, and couplings 57 (e.g., serrations) to a steering shaft 62 of a steering gearbox 60.

The steering gearbox 60 comprises the steering shaft 62, a magnetostrictive torque sensor (hereinafter referred to as a "fifth torque sensor 10E") according to a fifth embodiment of the present invention for detecting the steering torque applied by the driver, a motor 64 such as a brushless motor for generating power to assist the driver in steering the vehicle, a speed reducer 66 including a worm 68 and a worm wheel 70 for increasing the rotational torque from the motor 64, and a rack shaft 80 including a rack gear 74 of a rack and pinion gear mechanism 72 and a screw groove 78 of a ball screw 76. The worm wheel 70 of the speed reducer 66 is fixed to the ball screw 76.

The steering wheel 52 is connected to one end of the steering shaft 62 of the steering gearbox 60 through the steering shaft 54, the first universal joint 56a, the intermediate shaft 58, and the second universal joint 56b. The other end of the steering shaft 62 makes up a pinion gear 82 of the rack and pinion gear mechanism 72.

Rotational torque produced by the motor 64 and which is increased by the speed reducer 66 is converted by the ball screw 76 into a thrust force in the axial direction of the rack shaft 80. The thrust force is transmitted through tie rods 84a, 84b to the left and right tires 86a, 86b of the vehicle. Depending on the steering angle of the steering wheel 52, the tires 86a, 86b turn about vertical axes thereof in order to change the driving direction of the vehicle.

Figure 10:
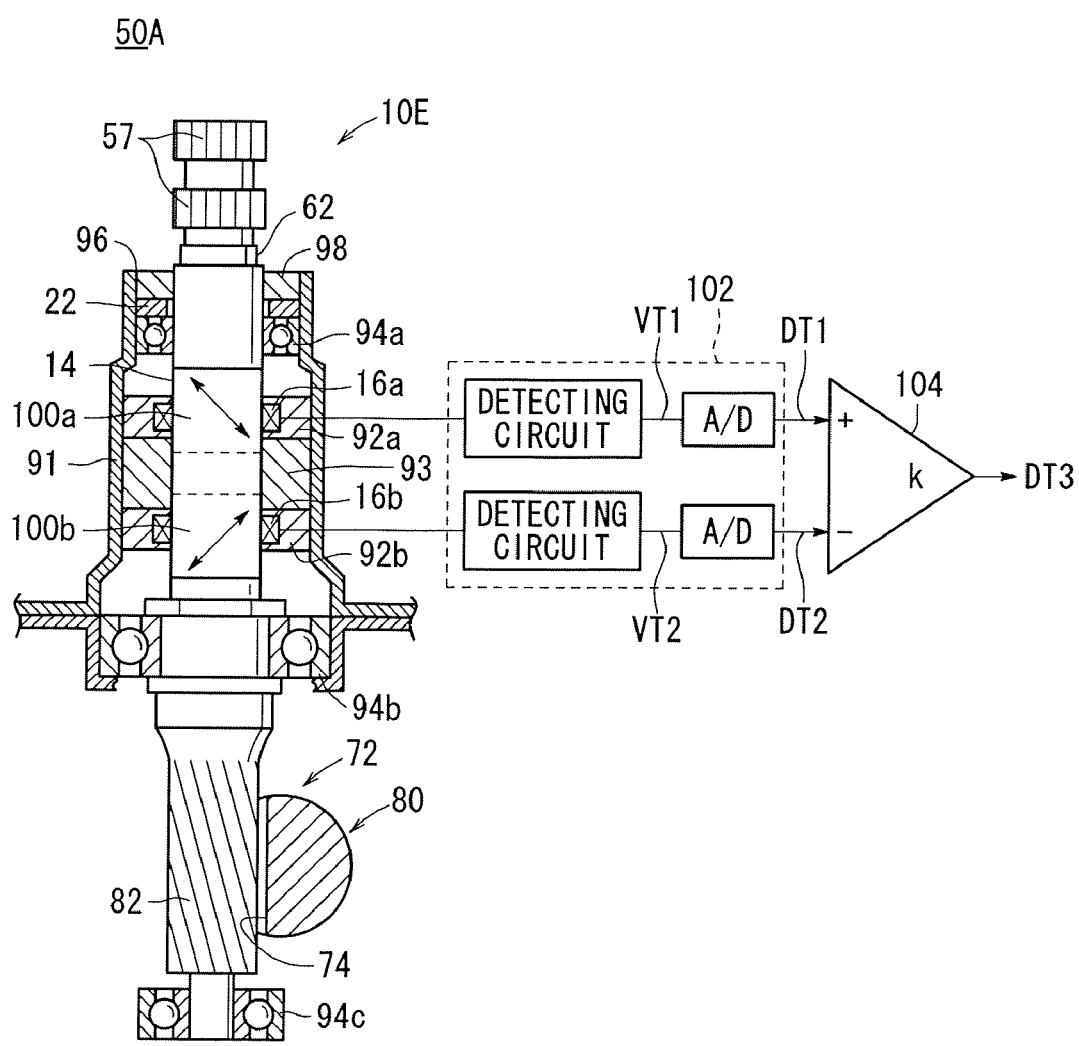
FIG. 10 is a cross-sectional view, partially in block form, of a fifth torque sensor according to the present invention.

A controller 88 (ECU) controls the motor 64 based on signals at least from the fifth torque sensor 10E and a vehicle speed sensor 90. In FIG. 10, various signal wires, e.g., signal wires between the controller 88 and the fifth torque sensor 10E, as well as signal wires between the controller 88 and the motor 64, have been omitted from illustration.

The steering torque applied from the steering wheel 52 when the steering wheel 52 is turned by the driver is detected by the fifth torque sensor 10E. The controller 88 controls the motor 64 based on the torque signal from the fifth torque sensor 10E, as well as the signal from the vehicle speed sensor 90. The rotational torque generated by the motor 64 acts through the speed reducer 66 and the ball screw 76 on the rack shaft 80, thereby reducing the torque required for the driver to turn the steering wheel 52. In this manner, the burden imposed on the driver when turning the steering wheel 52 is reduced. In other words, the burden imposed on the driver to produce a steering torque is reduced.

In the following formulas, it is assumed that the steering torque is represented by Ts, while an assistive force $A_H$ has a coefficient $k_A$, which is constant. Since $$A_H = k_A \times Ts,$$

the load in terms of a pinion torque Tp± may be expressed by:

$$Tp = Ts + A_H$$
$$= Ts + k_A \times Ts$$

As a result, the steering torque Ts may be expressed by:

$$Ts = Tp/(1+k_A)$$

Therefore, the steering torque Ts is reduced to $1/(1+k_A)$ of the pinion torque Tp when the pinion torque Tp is not assisted. In this case, $k_A > 0$ or $k_A = 0$.

As the vehicle speed goes higher, the reaction force applied from the road to the tires is reduced, and the response from the steering wheel 52 to the hands of the driver is reduced. If the coefficient $k_A$ is a function of vehicle speed and the coefficient $k_A$ becomes reduced as the vehicle speed is increased, then the response from the steering wheel 52 to the hands of the driver is prevented from becoming reduced as the vehicle speed increases. At this time as well, the steering torque Ts may be increased in order to apply a response from the steering wheel 52 to the hands of the driver.

As shown in FIG. 10, the fifth torque sensor 10E comprises a single magnetostrictive film 14 disposed on the outer circumferential surface of the steering shaft 62, a first detecting coil 16a and a second detecting coil 16b for detecting changes in the magnetic permeability of the magnetostrictive film 14 caused by a torsional torque applied to the steering shaft 62, and a housing 91 accommodating therein at least the steering shaft 62, the magnetostrictive film 14, the first detecting coil 16a, and the second detecting coil 16b. A first back yoke 92a and a second back yoke 92b, which serve as magnetic shields, are disposed respectively over the first detecting coil 16a and the second detecting coil 16b. A spacer 93, which also doubles as a positioner for positioning the first detecting coil 16a and the second detecting coil 16b, is interposed between the first back yoke 92a and the second back yoke 92b. The steering shaft 62 is rotatably supported in the housing 91 and the steering gearbox 60 by a first bearing 94a disposed closely to one end of the steering shaft 62, a second bearing 94b disposed centrally along the steering shaft 62, and a third bearing 94c disposed closely to the other end of the steering shaft 62. The first bearing 94a, the second bearing 94b, and the third bearing 94c each are made up of ball bearings. The housing 91 has an opening 96 close to one end of the steering shaft 62. A seal member 98, such as an oil seal, is disposed in the opening 96, thereby keeping the interior of the housing 91 and the steering gearbox 60 hermetically sealed.

The magnetostrictive film 14 is made of a magnetostrictive material formed of an Fe—Ni alloy, and has a thickness in the range from 5 to 100 μm. The magnetostrictive film 14 may alternatively be made of a magnetostrictive material formed of an Fe—Co alloy, an Sm—Fe alloy, or the like. The magnetostrictive film 14 is formed on the outer circumferential surface of the steering shaft 62 near one end thereof by plating, spraying, sputtering, evaporation, adhesive bonding, or the like, so that the magnetostrictive film 14 is of a substantially uniform thickness and can be held in close contact with the outer circumferential surface of the steering shaft 62. After the steering shaft 62 is machined but before the magnetostrictive film 14 is formed thereon, the outer circumferential surface of the steering shaft 62, on which the magnetostrictive film 14 is to be formed, is cleaned with an alkaline solution, water, an acid solution, or the like.

Figure 11:
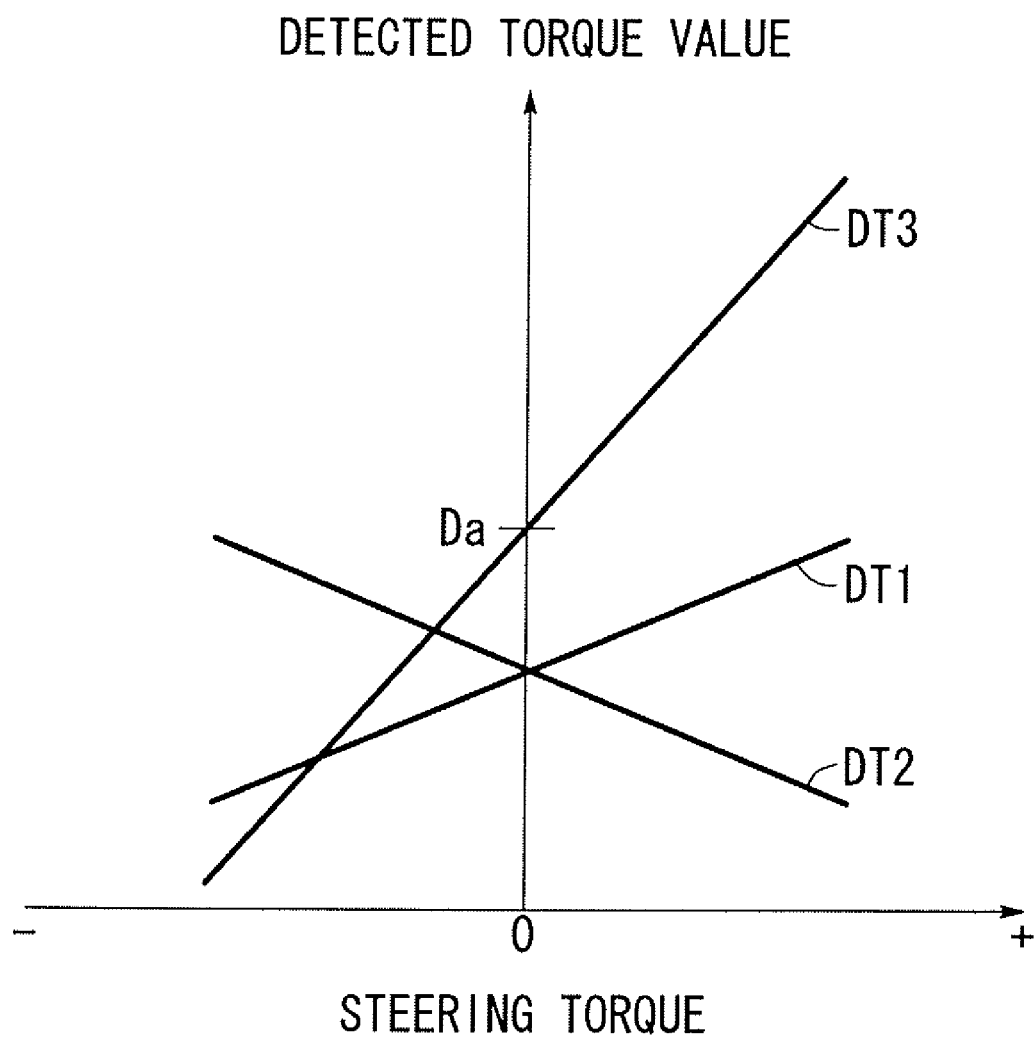
FIG. 11 is a characteristic diagram illustrating how detected torque values (detected data) of the fifth torque sensor change depending on a steering torque applied to the fifth torque sensor.

The magnetostrictive film 14 has a first anisotropic region 100a and a second anisotropic region 100b, which exhibit different anisotropic properties, i.e., anisotropic properties that are inverse to each other. The first anisotropic region 100a and the second anisotropic region 100b provide respective characteristic curves having opposite gradients representative of the detected data DT1, DT2 as shown in FIG. 11.

The magnetostrictive film 14 is rendered anisotropic as follows: While opposite torques, which are within a range of about 5 to 200 Nm, or which may be in a higher or lower range if necessary, are applied to the magnetostrictive film 14 through the steering shaft 62, the magnetostrictive film 14 is heated by a heat treatment such as high-frequency induction heating to a temperature ranging from about 300° C. to 500° C. for a period of time ranging from several seconds to several hundreds of seconds. When the magnetostrictive film 14 is heated, strains, which are caused in the magnetostrictive film 14 by the torques applied to the magnetostrictive film 14 through the rotatable shaft 12, are removed, so that the magnetostrictive film 14 is essentially free of stress. Then, the magnetostrictive film 14 is cooled down to normal temperature. Thereafter, the torques applied to the magnetostrictive film 14 through the steering shaft 62 are released. At this time, the magnetostrictive film 14 acquires anisotropy in the form of a first anisotropic region 100a and a second anisotropic region 100b.

The controller 88 supplies alternating currents to the first detecting coil 16a and the second detecting coil 16b through connectors, not shown. When the first detecting coil 16a and the second detecting coil 16b are energized by the alternating currents, changes caused in the magnetic permeabilities of the first anisotropic region 100a and the second anisotropic region 100b of the magnetostrictive film 14 due to the steering torque applied to the magnetostrictive film 14 are detected as changes in impedance of the first detecting coil 16a and the second detecting coil 16b. Such impedance changes are converted by detecting circuits of an interface 102 into a first detected voltage VT1 and a second detected voltage VT2. Then, the first detected voltage VT1 and the second detected voltage VT2 are converted into first detected data DT1 and second detected data DT2, respectively, by A/D converters of the interface 102. The interface 102 may be incorporated into the controller 88 or may be provided in the housing 91.

Changes in the magnetic permeabilities of the first anisotropic region 100a and the second anisotropic region 100b, i.e., the first detected data DT1 and the second detected data DT2, are read into an arithmetic unit 104 of the controller 88 through the interface 102. The arithmetic unit 104 then calculates digital data (detected torque data DT3), represented by the characteristic curve shown in FIG. 11, from the first detected data DT1 and the second detected data DT2. The torque data DT3 is calculated according to the following equation:

$$DT3=k\cdot(DT1=DT2)+Da$$

where k represents a proportionality constant.

The controller 88 controls the motor 64 based on the calculated detected torque data DT3, as described above.

The fifth torque sensor 10E includes a ring 22 fixed to the inner circumferential surface of the housing 91 near the opening 96. More specifically, the ring 22 is fixedly positioned between the first bearing 94a and the seal member 98 disposed in the opening 96. The ring 22 is made of pure copper, pure aluminum, a copper alloy, or an aluminum alloy, which has a smaller volume resistivity (i.e., a smaller electric resistance) than the aluminum alloy of the housing 91. The ring 22 may alternatively be fixed to the inner circumferential surface of the housing 91 near the second bearing 94b.

Since the ring 22 is fixed to the inner circumferential surface of the housing 91 near the opening 96, an alternating magnetic flux Φ, which is caused by an alternating magnetic field from the motor 64, an engine, an electric generator, or a motor on an electric vehicle, does not pass through the steering shaft 62. As a result, the fifth torque sensor 10E does not produce noise and vibrations due to the alternating magnetic flux Φ, so that the first power steering apparatus 50A allows the driver to experience a quiet and highly responsive steering feel.

In addition, since the fifth torque sensor 10E does not need to be combined with a low-pass filter, the sensor signal generated by the fifth torque sensor 10E is not delayed, and hence, the first power steering apparatus 50A enables the driver to experience a highly responsive steering feel.

Furthermore, the fifth torque sensor 10E does not adversely affect other sensors that are disposed near the steering shaft 62, such as a steering angle sensor, etc.

Figure 12:
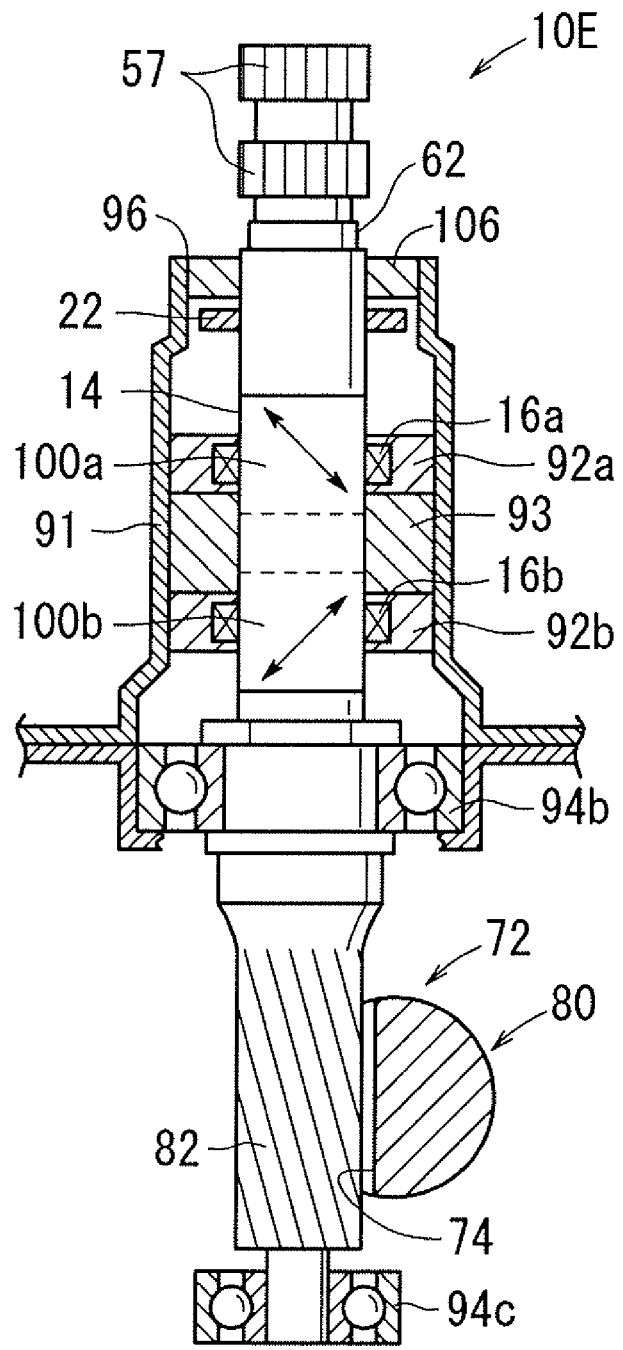
FIG. 12 is a cross-sectional view of a portion of a second power steering apparatus according to the present invention.

FIG. 12 shows in cross section an electric power steering apparatus according to a second embodiment of the present invention (hereinafter referred to as a "second power steering apparatus 50B"). As shown in FIG. 12, the second power steering apparatus 50B is similar to the first power steering apparatus 50A, but differs from the first power steering apparatus 50A in that a slide bearing 106, rather than the first bearing 94a, is disposed in the opening 96 of the housing 91. Also, the ring 22 is fixed to the steering shaft 62 near the end thereof having the opening 96. More specifically, the ring 22 is fixed to the steering shaft 62 between the upper end of the magnetostrictive film 14 and the lower end of the slide bearing 106. The upper end of the ring 22 is spaced from the lower end of the slide bearing 016 by a gap that ranges from 0 to 5 mm, for example. If the slide bearing 106 is made of a copper alloy having a small electric resistance, then since the slide bearing 106 also functions as the ring 22, the ring 22 can be dispensed with. Therefore, the cost of the second power steering apparatus 50B can be lowered.

Figure 13:
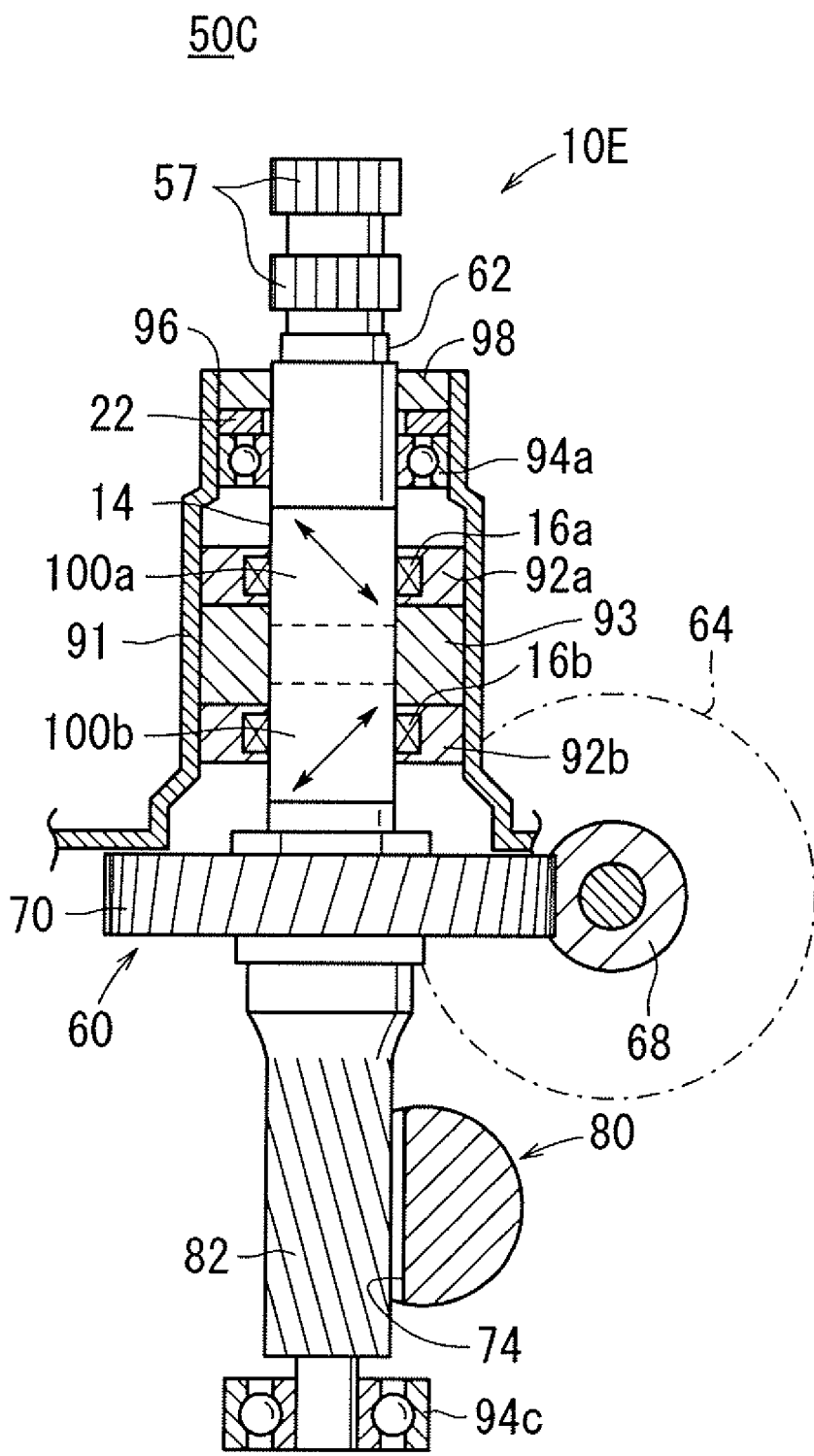
FIG. 13 is a cross-sectional view of a portion of a third power steering apparatus according to the present invention.

FIG. 13 shows in cross section an electric power steering apparatus according to a third embodiment of the present invention (hereinafter referred to as a "third power steering apparatus 50C"). As shown in FIG. 13, the third power steering apparatus 50C is similar to the first power steering apparatus 50A, but differs from the first power steering apparatus 50A in that the worm wheel 70 of the speed reducer 66 is mounted on the steering shaft 62, whereby rotational torque from the motor 64 is transmitted through the worm 68 and the worm wheel 70 to the steering shaft 62. Although not shown in FIG. 13, the ball screw 76 is not mounted on the rack shaft 80.

Rotational torque produced by the motor 64, and which is increased by the speed reducer 66, is converted by the pinion gear 82 of the rack and pinion gear mechanism 72 into a thrust force in the axial direction of the rack shaft 80. The thrust force is transmitted through the tie rods 84a, 84b to the left and right tires 86a, 86b of the vehicle.

The third electric power steering apparatus 50C includes a ring 22, which is fixed to the inner circumferential surface of the housing 91 near the opening 96 thereof. The third power steering apparatus 50C offers the same advantages as the first electric power steering apparatus 50A.

In the third electric power steering apparatus 50C, the ring 22 is capable of serving as a grease retainer for thereby increasing the durability of the seal member 98. Since the speed reducer 66 is mounted on the steering shaft 62, alternating magnetic flux Φ from the motor 64 tends to pass from the speed reducer 66 and into the steering shaft 62. However, the ring 22 is effective in preventing the alternating magnetic flux Φ from passing through the steering shaft 62. The ring 22 may be disposed near the worm wheel 70, rather than near the opening 96, in order to more effectively block the alternating magnetic flux Φ. More specifically, the ring 22 may be disposed on the steering shaft 62 between the magnetostrictive film 14 and the worm wheel 70, or the ring 22 may be disposed on the inner circumferential surface of the housing 91 between the second detecting coil 16b and the worm wheel 70, for example.

Although certain preferred embodiments of the present invention have been shown and described in detail, it should be understood that various changes and modifications may be made to the embodiments without departing from the scope of the invention as set forth in the appended claims.

What is claimed is:

1. A magnetostrictive torque sensor comprising:
a shaft member;
a magnetostrictive member mounted on the shaft member;
a coil for detecting a change in a magnetic property of the magnetostrictive member;
a housing accommodating therein the torque sensor; and
a nonmagnetic member comprising an electric conductor disposed around the shaft member and having a volume resistivity smaller than that of the housing.

2. A magnetostrictive torque sensor according to claim 1, wherein the nonmagnetic member has a hollow cylindrical shape.

3. A magnetostrictive torque sensor according to claim 1, wherein the nonmagnetic member has a thickness for generating an eddy current at least radially outwardly from the shaft member.

4. A magnetostrictive torque sensor according to claim 1, wherein the nonmagnetic member is separate from the shaft member.

5. A magnetostrictive torque sensor according to claim 1, wherein the housing has an opening defined therein near an end of the shaft member, the nonmagnetic member being disposed in the opening.

6. A magnetostrictive torque sensor according to claim 1, wherein the nonmagnetic member prevents leaking alternating magnetic fluxes from passing through the shaft member.

7. A magnetostrictive torque sensor according to claim 1, wherein the nonmagnetic member is press-fitted on the shaft member.

* * * * *